United States Patent [19]
Besserer et al.

[11] Patent Number: 5,749,476
[45] Date of Patent: May 12, 1998

[54] RACK FOR A SWITCHING CABINET

[75] Inventors: Horst Besserer, Herborn; Udo Münch, Sinn; Markus Neuhof, Ehringshausen; Walter Nicolai, Buseck; Adam Pawlowski, Dillenburg; Matthias Schüler, Dietzhölztal; Heinrich Strackbein, Biebertal, all of Germany

[73] Assignee: Rittal-Werk Rudolf Loh GmbH & Co. KG, Herborn, Germany

[21] Appl. No.: 628,621

[22] PCT Filed: Oct. 21, 1994

[86] PCT No.: PCT/EP94/03461

§ 371 Date: Apr. 10, 1996

§ 102(e) Date: Apr. 10, 1996

[87] PCT Pub. No.: WO95/11536

PCT Pub. Date: Apr. 27, 1995

[30] Foreign Application Priority Data

Oct. 23, 1993 [DE] Germany ............. 43 36 204.4

[51] Int. Cl.⁶ ........................................... A47F 5/00
[52] U.S. Cl. ................... 211/26; 211/182; 211/189; 312/265.1
[58] Field of Search ................. 211/182, 189, 211/191, 26; 312/265.1, 265.4

[56] References Cited

U.S. PATENT DOCUMENTS

| | | |
|---|---|---|
| 3,087,768 | 4/1963 | Anderson et al. |
| 4,643,319 | 2/1987 | Debus et al. ............ 211/189 |
| 4,988,008 | 1/1991 | Blum et al. ............ 211/26 X |
| 5,046,791 | 9/1991 | Kooiman ............ 312/265.1 |
| 5,275,296 | 1/1994 | Zacharai ............ 211/26 |
| 5,333,950 | 8/1994 | Zachrai ............ 211/26 X |

FOREIGN PATENT DOCUMENTS

| | | |
|---|---|---|
| 0127199 | 1/1988 | European Pat. Off. . |
| 0262599 | 4/1988 | European Pat. Off. . |
| 0533555 | 3/1993 | European Pat. Off. . |
| 2615684 | 11/1988 | France . |
| 8703695 | 2/1988 | Germany . |
| 3917985 | 12/1989 | Germany . |
| 3907471 | 1/1992 | Germany . |
| 4227532 | 2/1994 | Germany . |
| 8805253 | 7/1988 | WIPO . |

*Primary Examiner*—Robert W. Gibson, Jr.
*Attorney, Agent, or Firm*—Speckman Pauley Petersen & Fejer

[57] ABSTRACT

A rack for a switching cabinet comprising a plurality of frame parts and having fastening holes provided inside of the frame pieces forming internal edges of the rack. The frame pieces form only a frame support. At least a portion of the frame pieces are rigidly or detachably connected to a plurality of mounting rails which extend over at least a portion of the length of a corresponding frame piece, and along with the two profile sides having rows of fastening holes, form portions of internal edges.

29 Claims, 5 Drawing Sheets

5,749,476

RACK FOR A SWITCHING CABINET

BACKGROUND OF THE INVENTION

1. Field of the Invention

This invention relates to a rack for a switching cabinet made up of frame parts and having fastening holes provided inside of the frame pieces forming internal edges of the rack.

2. Description of Prior Art

A rack of this type is taught by German Patent Publication DE 33 44 598 C1. In accordance with the teachings of this reference the frame pieces themselves have two profile sides with rows of fastening holes. Manufacture of the frame pieces, with insertion of the fastening holes and shaping of the stamped sheet metal blanks, requires several working steps, which result in extremely high production costs. Moreover, all the frame pieces of the rack are provided with rows of fastening holes in order to provide possible attachments at all points in the rack, although in many cases this is not necessary. As the rows of fastening holes are also provided at uniform intervals, frequently special attachment means are necessary for incorporating special devices.

SUMMARY OF THE INVENTION

It is an object of this invention to provide a rack of the type already mentioned, which may be constructed with simpler frame pieces, which may be cost-effectively manufactured, and which may be subsequently adapted to the most varied types of attachment.

These and other objects are achieved in accordance with this invention by a rack comprising frame pieces forming only a support framework, at least a portion of the frame pieces being rigidly or detachably connected or connectable to mounting rails, which extend at least over a portion of the length of the associated frame piece, and, along with profile sides having rows of fastening holes, forming parts of internal edges.

In accordance with one embodiment of this invention, the rack is formed as a simple support framework, for which purpose simple and inexpensively manufactured frame pieces may be used. With the aid of mounting rails, the support framework may be equipped at the necessary points for the incorporation of devices, this also being achievable subsequently. In this case, different sub-divisions are provided in one and the same rack by means of mounting rails with different fastening holes, or alternatively the intervals between the fastening holes may also be again altered subsequently by the incorporation of other mounting rails. The rack so constructed, thus, offers substantially more possible variations than the known rack. Moreover, the support framework in accordance with one embodiment of this invention may also be provided with individual mounting rails.

Attachment of the mounting rails to the frame pieces of the support framework is simplified by the frame pieces each having a receiving means defined by two profile side sections into which the mounting rail may be inserted in such a way that the profile sides provided with the fastening holes form internal sides of the support framework.

In accordance with one embodiment of this invention in which four frame pieces of the support framework in each case are connected to two non-detachable support frameworks, and in which the two support frameworks are detachably connected or connectable in the corner regions by four frame pieces in the form of connecting struts, the rack may be stored and transported in a dismantled state.

The rack may be produced in a particularly cost-effective way where, in accordance with one embodiment, the frame pieces of the support framework are in the form of open hollow profile sections, which are preferably folded from sheet metal blanks.

In accordance with yet another embodiment, the mounting rails are formed as open or closed hollow profile sections, two profile sides of which form fastening holes, and the profile side sections of the frame pieces of the support framework forming the receiving means for the mounting rail abut on profile sides of the mounting rails. Thus, upon connection to the frame pieces of the support framework, the mounting rails always adopt a specific position.

In order to achieve universal possibilities of attachment on all frame pieces of the support framework, according to one embodiment of this invention the mounting rails are combined into a mounting framework. In order to simplify assembly of the mounting framework, the mounting framework is assembled or may be assembled from two non-detachable mounting frames and four mounting rails forming connecting struts.

In accordance with one embodiment of this invention, the frame pieces of the support framework have a substantially identical cross-section. The same also applies to the mounting rails of the mounting framework, the mounting rails however being capable of having the same and/or different rows of fastening holes.

A compact storage and transport of a rack with reduced assembly work at the point of use is achieved in accordance with one embodiment of this invention wherein a support framework of the support frame and a mounting framework of the mounting frame are each combined into one unit, and wherein a frame piece of the support framework, formed as a connecting strut, is combined with a mounting rail to form a unit.

In accordance with one embodiment of this invention where a rack is desired, for example for reasons of simplified servicing of various assemblies, having one inclined side, then the frame pieces of the support frame used as connecting struts and the mounting rails of the mounting frame used as connecting struts have, in pairs, a different length.

In accordance with yet another embodiment, the supporting frames of the support framework are substantially identical in form, the frame pieces being welded rigidly together. In this way, excellent stability and resistance to torsion are achieved. In accordance with another embodiment, the mounting frames of the mounting framework are identical in form, the mounting rails being rigidly welded together.

BRIEF DESCRIPTION OF THE DRAWINGS

This invention will be explained in more detail with reference to embodiments given by way of example and shown in the drawings wherein.

DETAILED DESCRIPTION OF PREFERRED EMBODIMENTS

Figure 1:
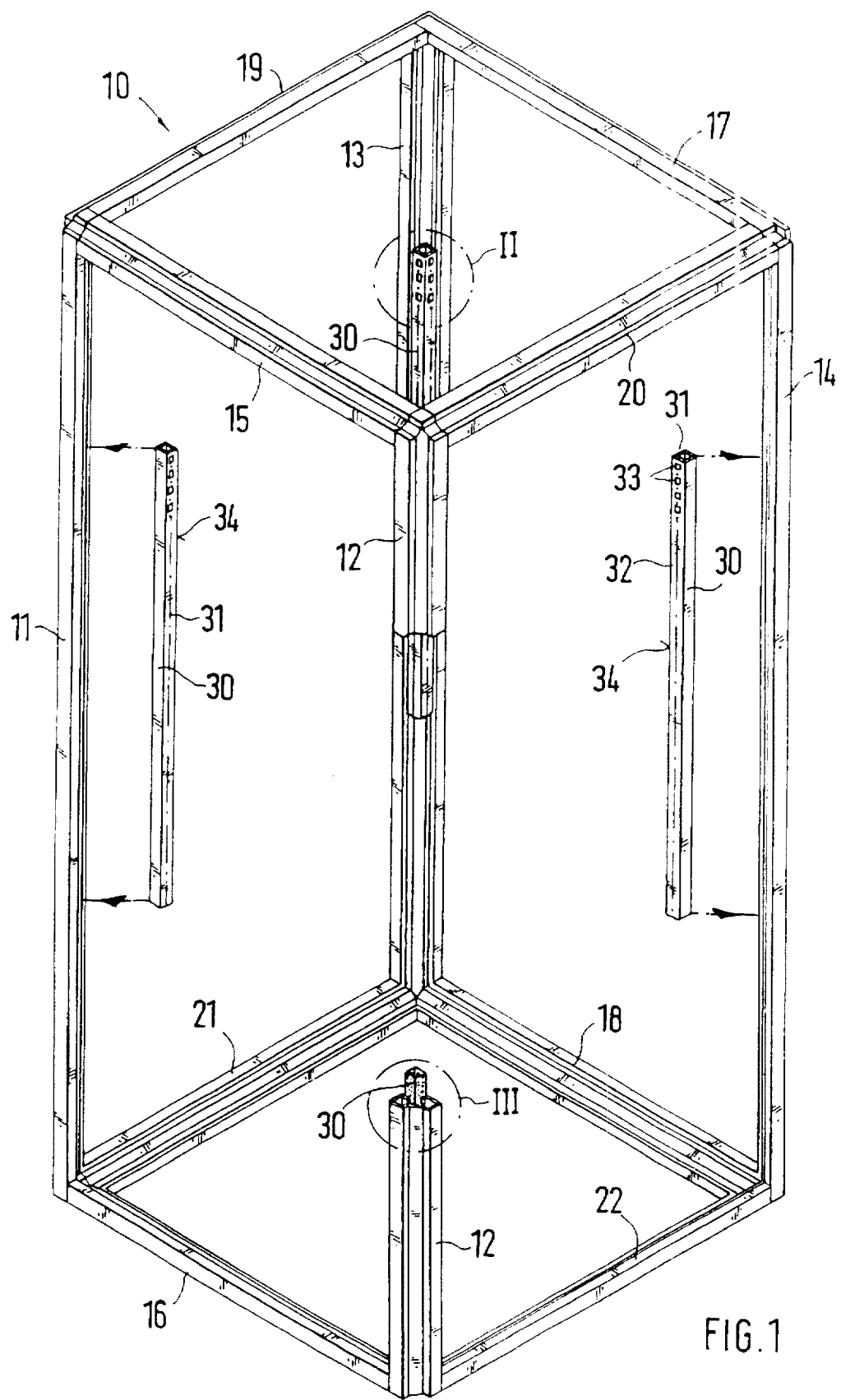
FIG. 1 is a perspective view of a support framework made up of frame pieces upon whose vertical frame pieces mounting rails may be attached.
Figure 2:
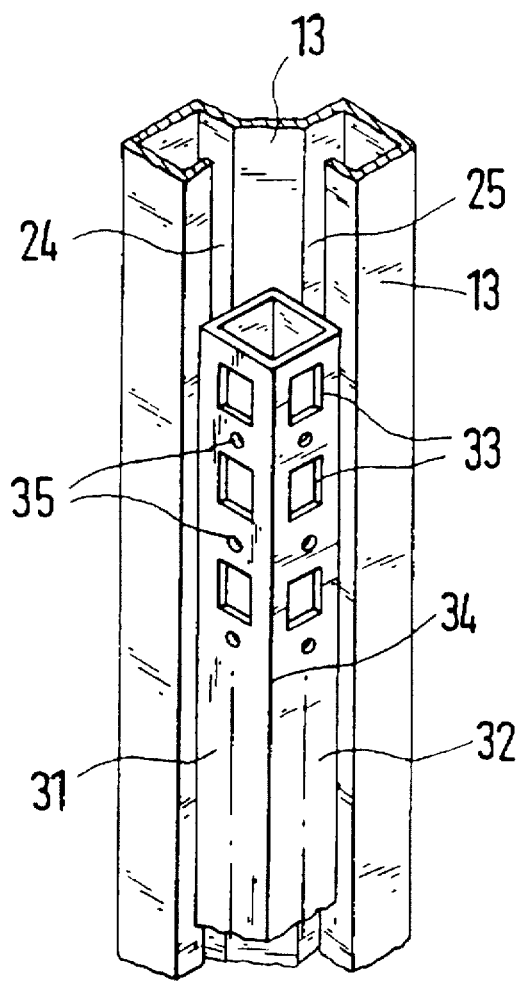
FIG. 2 is a perspective partial view of region II of the support framework shown in FIG. 1, showing the attachment of a mounting rail to a frame piece provided with a receiving means.
Figure 3:
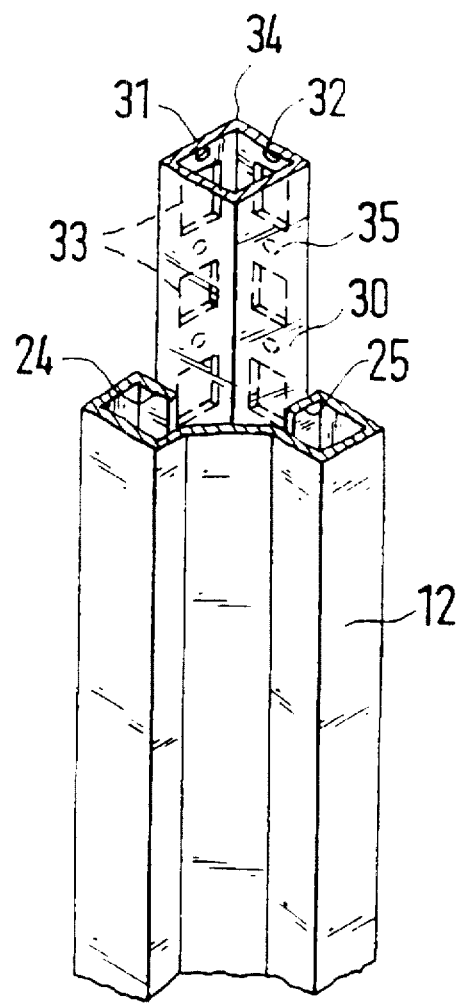
FIG. 3 is a perspective partial view of region III of the support framework shown in FIG. 1, showing the attachment of a mounting rail to a frame piece provided with a receiving means.

As FIG. 1 shows, in the rack in accordance with one embodiment of the invention the support function and the attachment function are separated. Assembled, preferably from frame pieces 11, 12, 13, 14, 15, 16, 17, 18, 19, 20, 21, 22 of substantially identical cross-section, is a support framework 10, which provides the support function of the rack. On the sides of the frame pieces of the vertical frame pieces 11, 12, 13 and 14 oriented towards the interior space of support frame 10, there are attached, e.g. screwed, riveted or welded, mounting rails 30. These mounting rails 30 extend over a portion of the length of the vertical frame pieces 11, 12, 13 and 14 and are attached at the point provided for the mounting of devices. These mounting rails 30 have in the embodiment shown two profile sides 31 and 32, disposed perpendicular to one another, as shown in FIGS. 2 and 3. These two profile sides 31 and 32 are, after attachment to the associated frame piece 12 or 13, aligned parallel to the outer sides of the support frame 10, so that, along with the edge 34, between these two profile sides 31 and 32, a portion of an inner edge of the rack is formed. The profile sides 31 and 32 are each provided with a row of fastening holes 33 and 35, which may be in the form of square or rectangular apertures and bores. The two rows of fastening holes 33 and 35 are provided at substantially uniform intervals, and are aligned towards one another in the two profile sides 31 and 32.

The module rails 30, which are connected to the support framework 10, may also have fastening holes which deviate therefrom at a different distribution. This depends only on which types of devices are to be incorporated in the rack. The switching cabinet may also be supplied only with the support framework, and at the point of use, any type of mounting rails may be attached to the frame pieces 11 to 22 of the support framework 10. As the horizontal frame pieces 15, 16, 17 and 18 and the frame pieces 19, 20, 21 and 22 used as connecting struts show, the attachment of mounting rails 30 may also be restricted to only a portion of the frame pieces of the support framework 10. The possibility of subsequently equipping the mounting rails 30 provides the new rack with a considerably greater possible range of variation and construction.

As can further be seen from the partial views in FIGS. 2 and 3, the frame pieces of the support framework 10 may be folded as simple bent parts from a sheet metal blank, and preferably form an inwardly-aligned profile, whose profile side sections 24 and 25 form a receiving means for the mounting rails 30, formed, for example, as a square hollow profile section 30, which is connected to these profile side sections 24 and 25 abutting on the frame piece. Thus, the profile sides 31 and 32 of the mounting rail 30 project into the internal space of the support framework 10 and form with the edge 34 a portion of the inner edge of the rack. The frame pieces 11 to 22 of the support framework 10 are easily and inexpensively manufactured with sufficient stability and resistance to torsion and if necessary, may be extended or developed with appropriate mounting rails 30.

Figure 4:
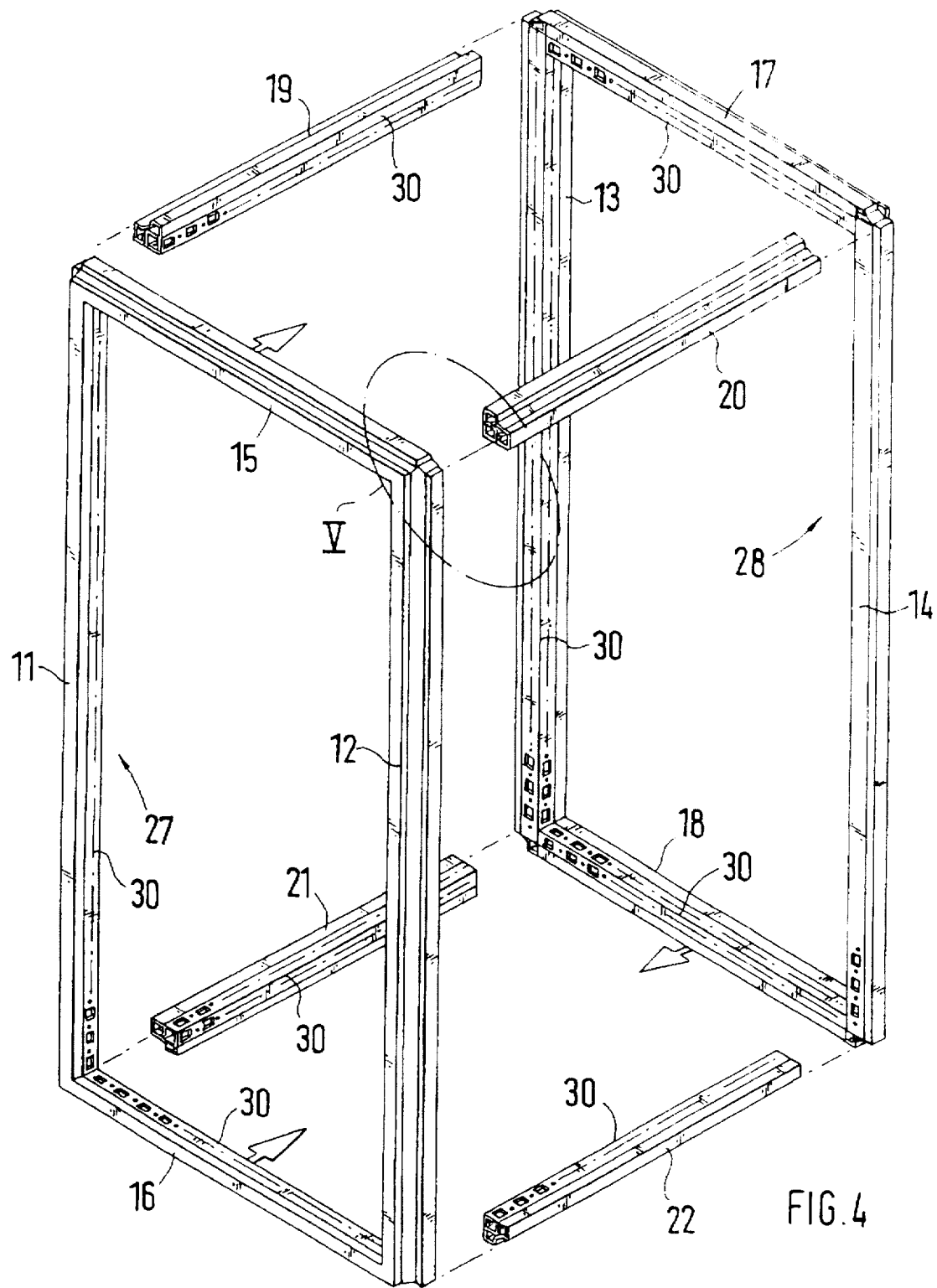
FIG. 4 is a perspective assembled view of two units from a support frame in accordance with one embodiment of this invention with attached mounting frames and four units consisting of frame pieces as mounting rails, used as connecting struts.
Figure 5:
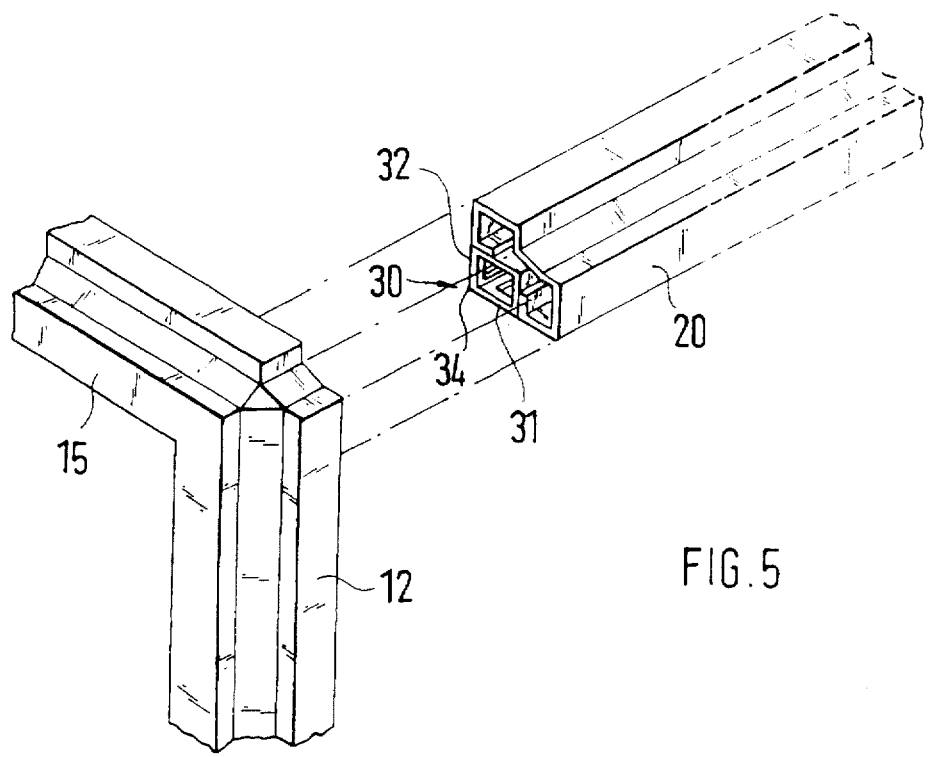
FIG. 5 is a perspective partial view of region V of FIG. 4.

In accordance with the embodiment shown in FIG. 4, the support framework 10 may be assembled from the frame pieces 11 to 22 and a mounting frame formed from twelve mounting rails 30 in another manner. The forward frame pieces 11, 12, 15 and 16 form a non-detachable support framework 27, on each of whose frame pieces a mounting rail 30, extending over the entire length of the frame pieces 11, 12, 15 and 16, is detachably attached. In the same way, an identical support frame 28 is made up of the frame pieces 13, 14, 17 and 18, and provided with mounting rails 30. The two support frames 27 and 28 are detachably connected at their corners by means of the frame pieces 19, 20, 21 and 22 used as connecting struts, so that the rack may be compactly stored and transported and simply assembled at the point of use. In this case, the frame pieces 19 to 22 may be attached with or without mounting rails 30. Instead of the mounting rails 30 formed as mounting frames, only mounting rails 30 as in the embodiment shown in FIG. 1 may be attached to the support frames 27 and 28. As the partial view according to FIG. 5 shows, the mounting rail 30 fits flush into the receiving means formed by the frame pieces 20, so that mounting rail 30 and frame piece 20 form flush internal sides.

Figure 6:
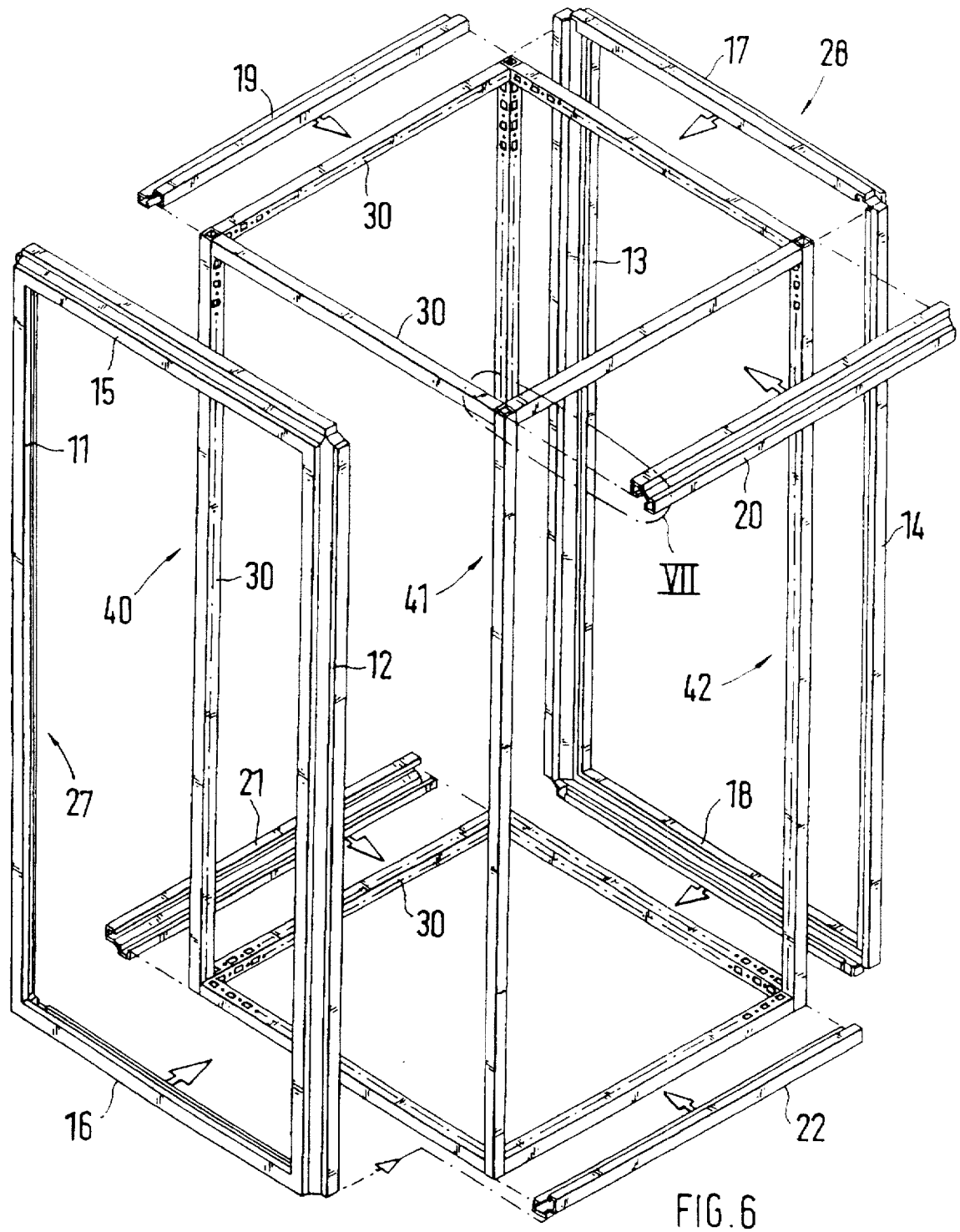
FIG. 6 is a perspective view of an assembled mounting frame, to which are attachable two support frames and four frame pieces of the support framework in accordance with one embodiment of this invention

In accordance with the embodiment shown in FIG. 6, a mounting frame 40 made up of twelve mounting rails 30 is constructed which can be subsequently secured in support frame 10 made up of the frame pieces 11 to 22. This can be effected only after the incorporation of devices in the mounting frame 40.

Figure 7:
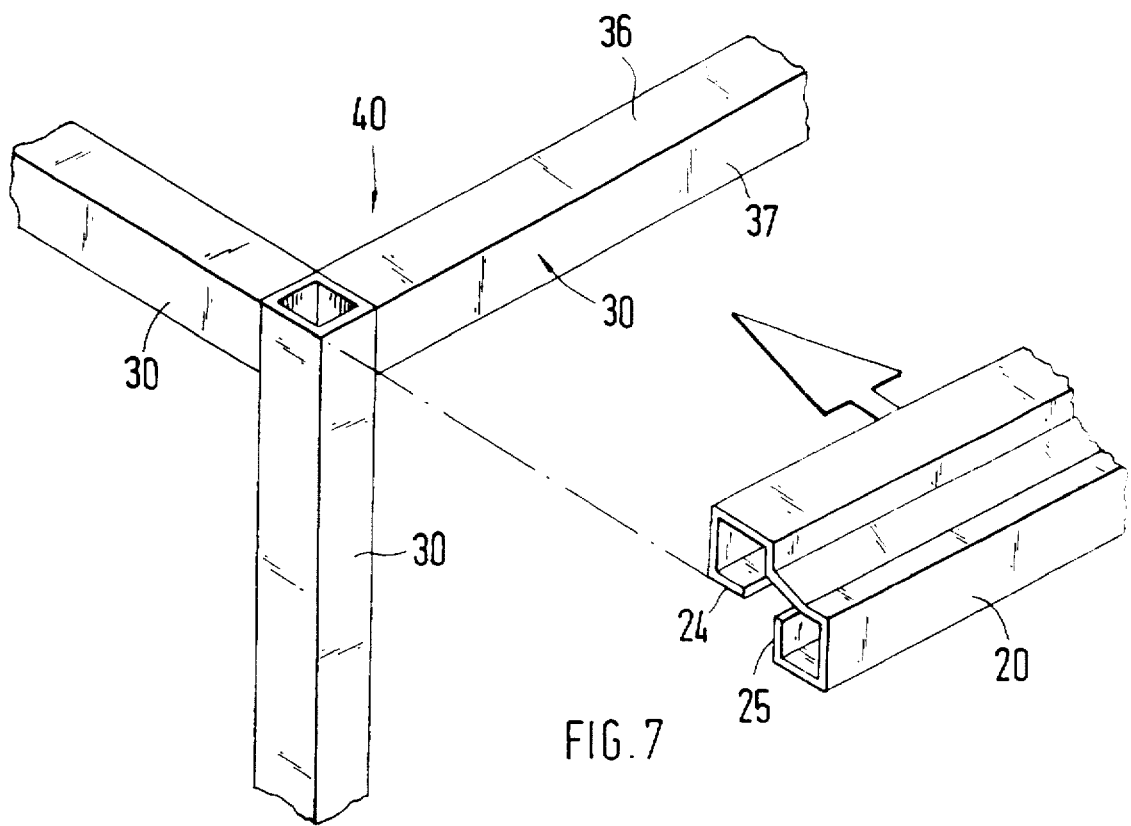
FIG. 7 is a perspective partial view of region VII of FIG. 6.

The mounting frame 40 in accordance with one embodiment of this invention comprises of twelve mounting rails 30, e.g. with the aid of corner connectors. In accordance with another embodiment, mounting frame 40 comprises two identical mounting frames 41 and 42 with four mounting rails 30 used as connecting struts. Two support frames 27 and 28 and four frame pieces 19, 20, 21 and 22, used as connecting struts, are attached to the finished mounting frame 40, the connections between the support frames 27 and 28 and the frame pieces 19 to 22 and to the mounting frame 40 being produced. Thus, the receiving means of the frame pieces 11 to 18 of the support frames 27 and 28, formed by the profiled side sections 24 and 25, and of the frame pieces 19 to 22 used as connecting struts, receive the mounting rails 30 of the mounting frame 40 in a flush manner, as is shown by the partial view in FIG. 7.

The new design of the rack also permits, as the embodiments show, a varied structure of the rack and thus incorporation of the devices at the point of use.

The support frames of the support framework and the mounting frames of the mounting framework may also be assembled from four lateral frame pieces or mounting rails. Also the lower or upper frame pieces or mounting rails may be assembled with vertical frame pieces or mounting rails to form a support frame or mounting frame.

The profile sides of the mounting rail and the profile side sections of the frame pieces of the support frame need not necessarily stand perpendicularly to one another. The support frame and the mounting frame may also comprise more or fewer than twelve frame pieces or mounting rails.

We claim:

1. In a rack for a switchgear cabinet having a plurality of frame pieces constituting a support framework, a plurality of mounting rails with mounting rail profile sides, extending along a length of the frame pieces and connected to the frame pieces such that they project into an interior of the support framwork with said mounting rail profile sides exposed, said mounting rail profile sides extending at right angles to each other and each forming at least one row of fastening receivers, the improvement comprising:

the mounting rails (30), each of which extend at least over a portion of the length of an associated said frame piece (11 to 22), being fixed in a receiver extending parallel thereto and constituted by two lateral frame piece profiled sections (24, 25) of the frame pieces (11 to 22), and the mounting rails profile sides (31, 32) having said at least one row of fastening receivers (33) together forming an inner edge (34) of the rack.

2. A rack in accordance with claim 1, wherein the two lateral frame piece profile sections (24, 25) are beveled toward a frame piece interior of the frame pieces (11 to 22), and the mounting rails (30) are fitted flush in the receivers formed by the lateral frame piece profile sections (24, 25) such that the mounting rails (30) and the frame pieces (20) form flush insides of the rack.

3. A rack according to claim 1, wherein four of said frame pieces (11, 12, 15, 16 or 13, 14, 17, 18) of the support framework (10) are connected to two non-detachable support frames (27, 28), said two non-detachable support frames (27, 28) being detachably connected to one another by another four of said frame pieces (19, 20, 21, 22) formed as connecting struts.

4. A rack according to claim 1, wherein the frame pieces (11 to 22) of the support framework (10) are in the form of open hollow profile sections formed from sheet metal blanks.

5. A rack according to claim 1, wherein the mounting rails (30) are formed as hollow profile sections, two said mounting rail profile sides (31, 32) of which form said fastening receivers (33, 35), and the lateral frame piece profile sections (24, 25) of the frame pieces (11 to 22) of the support framework (10) forming the receiving means for the mounting rail (30) disposed perpendicular to one another.

6. A rack according to claim 1, wherein the mounting rails (30) are assembled, forming a mounting framework (40).

7. A rack according to claim 6, wherein the mounting framework (40) comprises two non-detachable mounting frames (41, 42) and four said mounting rails (30), forming connecting struts.

8. A rack according to claim 1, wherein the frame pieces (11 to 22) of the support framework (10) have substantially identical cross-sections.

9. A rack according to claim 1, wherein the mounting rails (30) have a substantially uniform cross-section and one of substantially identical and different said rows of fastening holes (33, 35).

10. A rack according to claim 3, wherein said non-detachable support frames (27, 28) of the support framework (10) and a mounting frame of the mounting framework (40) are assembled, forming a unit, and at least one of said frame pieces (19, 20, 21, 22) of the support framework (10), formed as a connecting strut, is connected to one of said mounting rails (30), forming a unit.

11. A rack according to claim 1, wherein the frame pieces (19, 20 or 21, 22) of the support framework (10) in the form of connecting struts, and the mounting rails (30) of the mounting framework (40) in the form of connecting struts, have, in pairs, different lengths.

12. A rack according to claim 1, wherein the non-detachable support frames (27, 28) of the support framework (10) are substantially identical in form, and the frame pieces (11, 12, 15, 16) or (13, 14, 17, 18) are rigidly welded together.

13. A rack according to claim 1, wherein the mounting frames (41, 42) of the mounting framework (40) are substantially identical in form and the mounting rails (30) are rigidly welded together.

14. A rack according to claim 2, wherein four of said frame pieces (11, 12, 15, 16 or 13, 14, 17, 18) of the support framework (10) are connected to two non-detachable support frames (27, 28), said two non-detachable support frames (27, 28) being detachably connected to one another by another four of said frame pieces (19, 20, 21, 22) formed as connecting struts.

15. A rack according to claim 14, wherein the frame pieces (11 to 22) of the support framework (10) are in the form of open hollow profile sections formed from sheet metal blanks.

16. A rack according to claim 15, wherein the mounting rails (30) are formed as hollow profile sections, two said mounting rail profile sides (31, 32) of which form said fastening receivers (33, 35), and the lateral frame piece profile sections (24, 25) of the frame pieces (11 to 22) of the support framework (10) forming the receiving means for the mounting rail (30) disposed perpendicular to one another.

17. A rack according to claim 16, wherein the mounting rails (30) are assembled, forming a mounting framework (40).

18. A rack according to claim 17, wherein the mounting framework (40) comprises two non-detachable mounting frames (41, 42) and four said mounting rails (30), forming connecting struts.

19. A rack according to claim 18, wherein the frame pieces (11 to 22) of the support framework (10) have substantially identical cross-sections.

20. A rack according to claim 19, wherein the mounting rails (30) have a substantially uniform cross-section and one of substantially identical and different said rows of fastening holes (33, 35).

21. A rack according to claim 7, wherein said non-detachable support frames (27, 28) of the support framework (10) and a mounting frame of the mounting framework (40) are assembled, forming a unit, and at least one of said frame pieces (19, 20, 21, 22) of the support framework (10), formed as a connecting strut, is connected to one of said mounting rails (30), forming a unit.

22. A rack according to claim 14, wherein said non-detachable support frames (27, 28) of the support framework (10) and a mounting frame of the mounting framework (40) are assembled, forming a unit, and at least one of said frame pieces (19, 20, 21, 22) of the support framework (10), formed as a connecting strut, is connected to one of said mounting rails (30), forming a unit.

23. A rack according to claim 18, wherein said non-detachable support frames (27, 28) of the support framework (10) and a mounting frame of the mounting framework (40) are assembled, forming a unit, and at least one of said frame pieces (19, 20, 21, 22) of the support framework (10), formed as a connecting strut, is connected to one of said mounting rails (30), forming a unit.

24. A rack according to claim 22, wherein the frame pieces (19, 20 or 21, 22) of the support framework (10) in the form of connecting struts, and the mounting rails (30) of the mounting framework (40) in the form of connecting struts, have, in pairs, different lengths.

25. A rack according to claim 23, wherein the frame pieces (19, 20 or 21, 22) of the support framework (10) in the form of connecting struts, and the mounting rails (30) of the mounting framework (40) in the form of connecting struts, have, in pairs, different lengths.

26. A rack according to claim 24, wherein the non-detachable support frames (27, 28) of the support framework (10) are substantially identical in form, and the frame pieces (11, 12, 15, 16) or (13, 14, 17, 18) are rigidly welded together.

27. A rack according to claim 25, wherein the non-detachable support frames (27, 28) of the support framework (10) are substantially identical in form, and the frame pieces (11, 12, 15, 16) or (13, 14, 17, 18) are rigidly welded together.

28. A rack according to claim 26, wherein the mounting frames (41, 42) of the mounting framework (40) are substantially identical in form and the mounting rails (30) are rigidly welded together.

29. A rack according to claim 27, wherein the mounting frames (41, 42) of the mounting framework (40) are substantially identical in form and the mounting rails (30) are rigidly welded together.

* * * * *